(12) United States Patent
Ina (10) Patent No.: US 6,965,435 B2
(45) Date of Patent: Nov. 15, 2005

(54) INTERFEROMETER SYSTEM FOR MEASURING SURFACE SHAPE

(75) Inventor: Hideki Ina, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 264 days.

(21) Appl. No.: 10/207,799

(22) Filed: Jul. 31, 2002

(65) Prior Publication Data

US 2003/0025916 A1 Feb. 6, 2003

(30) Foreign Application Priority Data

Aug. 1, 2001 (JP) ......................................... 2001-233125

(51) Int. Cl.$^7$ .............................................. G01B 9/02
(52) U.S. Cl. ....................................................... 356/513
(58) Field of Search ................................ 356/511, 512, 356/513, 515

(56) References Cited

U.S. PATENT DOCUMENTS

| | | | | |
|---|---|---|---|---|
| 4,725,144 A | | 2/1988 | Nelson et al. ............... | 356/360 |
| 5,485,275 A | * | 1/1996 | Ohtsuka ....................... | 356/513 |
| 5,500,767 A | * | 3/1996 | Maruyama et al. ......... | 359/642 |
| 5,563,706 A | * | 10/1996 | Shibuya et al. ............. | 356/495 |
| 5,818,632 A | * | 10/1998 | Stephenson ................. | 359/565 |
| 5,986,760 A | | 11/1999 | Nakayama et al. ......... | 356/359 |
| 6,184,994 B1 | * | 2/2001 | Freischlad ................... | 356/511 |
| 6,714,307 B2 | * | 3/2004 | De Groot et al. ........... | 356/512 |
| 6,774,982 B2 | * | 8/2004 | Ouchi ........................... | 355/67 |
| 6,785,006 B2 | * | 8/2004 | Nishida ....................... | 356/515 |
| 2002/0176090 A1 | | 11/2002 | Ohsaki et al. ............... | 356/512 |
| 2003/0011783 A1 | | 1/2003 | Suzuki et al. ................ | 356/512 |

FOREIGN PATENT DOCUMENTS

| | | |
|---|---|---|
| DE | 198 22 453 A1 | 12/1999 |
| JP | 2000-097665 | 7/2000 |

* cited by examiner

Primary Examiner—Gregory J. Toatley, Jr.
Assistant Examiner—Michael A. Lyons
(74) Attorney, Agent, or Firm—Fitzpatrick, Cella, Harper & Scinto (57) ABSTRACT

Disclosed is an interferometer that enables high-speed and high-precision measurement of a surface shape of an article and a method of producing such interferometer. Also disclosed is a method of measuring a surface shape of an article by use of such interferometer. The interferometer includes an optical system having an optical element being effective to make, into an aspherical wave, a wavefront of light to be projected on the article to be inspected, and also being arranged to be replaceable by another optical element.

13 Claims, 4 Drawing Sheets

—PRIOR ART—

FIG. 4

—PRIOR ART—

FIG. 5

INTERFEROMETER SYSTEM FOR MEASURING SURFACE SHAPE

FIELD OF THE INVENTION AND RELATED ART

This invention relates generally to an interferometer for measuring a surface shape and to a method of measuring a surface shape by use of an interferometer. More particularly, the present invention is suitable for high-speed and high-precision measurement of a three-dimensional shape of an article to be inspected, having an aspherical shape, for example.

As regards shape measuring apparatuses for performing high-precision and three-dimensional measurement of the shape of an article to be inspected, there are three-dimensional shape measuring apparatuses using a Fizeau interferometer (plane wave is used as an inspection wavefront). Many machines of this type are currently commercially available.

Figure 3:
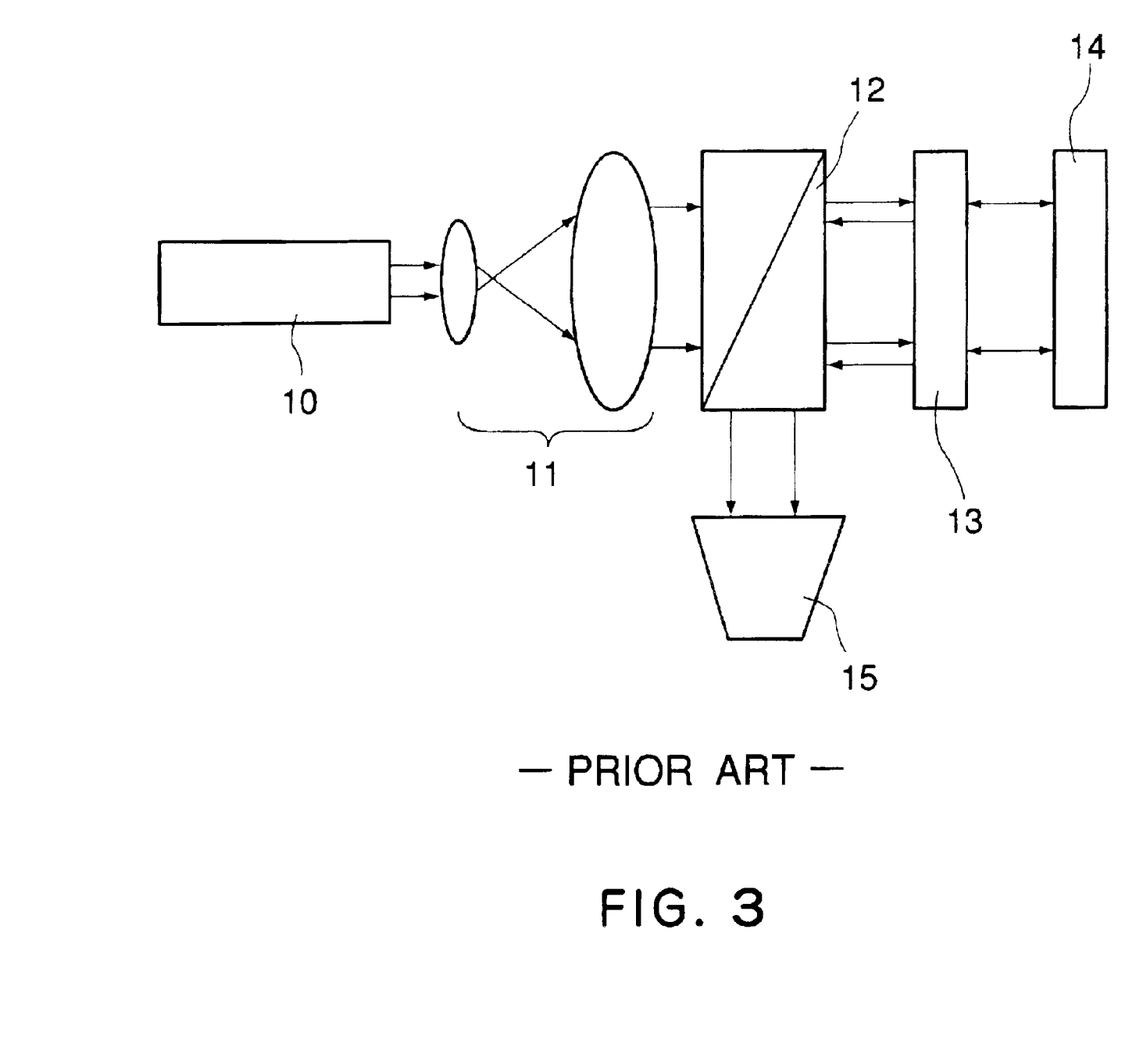
FIG. 3 is a schematic view of a conventional Fizeau interferometer for plane surface measurement.

FIG. 3 is a schematic view for explaining a basic structure for measuring the shape of a planar object by use of a conventional Fizeau interferometer. Light source 10 comprises a laser such as He—Ne laser, for example, and light from the light source 10 is transformed into a plane wave, being expanded in diameter by means of a beam expander 11. After this, the light passes through a half mirror 12. Thus, the plane wave functions as a measuring wavefront, and it irradiates an object 14 to be inspected. Disposed between the half mirror 12 and the object 14 is a reflection member 13 for obtaining reference light. One surface of the reflection member 13 is set so as to reflect, with respect to a certain measurement wavelength, a half or less of the light (e.g., 30%) and also to transmit a half or more of the light (e.g., 70%) therethrough. The light transmitted through the reflection member 13 is incident on the object 14. The light reflected thereby as measurement light having information regarding the object 14, is again incident on the reflection member 13. Both of reference light which is directly reflected back from the reflection member 13 and measurement light reflected from the object 14, are then reflected by the half mirror 12, such that interference fringe is produced on an image pickup device 15 such as a CCD camera, for example. By processing the produced interference fringe, the surface shape of the object 14 can be detected.

The visibility which is influential to the measurement precision, that is, the contrast of the interference fringe, depends on the intensity ratio between the reference light directly reflected from the reflection member 13 and the measurement light as reflected from the object 14, both upon the image pickup device 15. When these lights have the same intensity, the contrast becomes highest. Therefore, there are cases wherein reflection members 13 of different reflectivities are used selectively so that two lights which interfere with each other in accordance with the reflectivity of the object 14 may have the same intensity.

Figure 4:
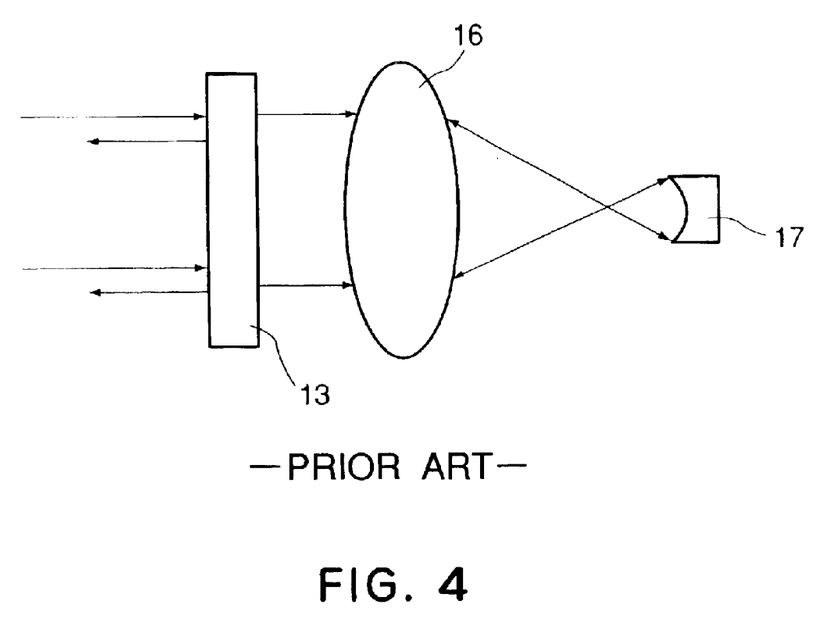
FIG. 4 is a schematic view of a conventional Fizeau interferometer for spherical surface measurement.

Fizeau interferometer may be applied to measurement of a spherical surface. FIG. 4 shows a structure for measuring the shape of a concave surface, as an object 17 to be inspected. There are laser 10, beam expander 11, half mirror 12 and image pickup device 15 all of which have the same structure as of those shown in FIG. 3, and thus only a reflection member 13 and some components following it for obtaining reference light are illustrated in FIG. 4. Since the wavefront of light projected for inspection onto the object to be inspected should be spherical wave, in the structure of FIG. 4, a condensing lens 16 is used to produce a spherical wave which is projected on the concave surface 17 (surface to be inspected) to enable measurement of spherical surface shape.

Figure 5:
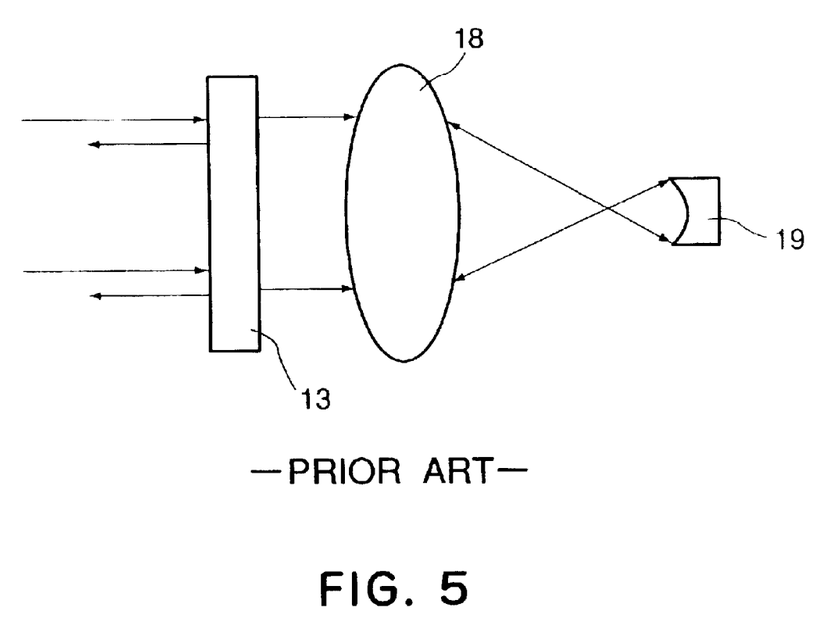
FIG. 5 is a schematic view of a conventional interferometer for measurement of transmission wavefront as of an objective lens, for example.

Fizeau interferometers can be used also in transmission wavefront measurement of a high-performance optical system. FIG. 5 shows the structure for measuring transmission wavefront of an objective lens. Also in the case of FIG. 5, since there are beam expander 11, half mirror 12 and image pickup device 15 having the same structure as of FIG. 3, only a reflection member 13 and some components following it for obtaining reference light are illustrated. In the structure illustrated, a plane wave transmitted through the reflection member 13 enters an objective lens 18 which is the article to be inspected. After passing the objective lens 18, it is once imaged and then a spherical wave is formed. This spherical wave is reflected by a tool mirror 19. The reflected light (measurement light) again passes through the objective lens 18, and it interferes with reference light directly reflected by the reflection member 13, whereby an interference fringe is produced. By processing the thus produced interference fringe, the transmission wavefront of the objective lens 18 can be detected.

As a measuring system for exclusive use in measurement of a spherical shape, there is a method which uses Michelson interferometer. Products of performing high-speed focus adjustment in formation of interference fringe are already commercially available.

As described above, planar shape and spherical shape can be measured in the manner having been described with reference to FIGS. 3 and 4, in a non-contact method and at high speed and high precision.

After the interference fringe is produced, the reference wave is tilted (in the case of Fizeau interference) or the optical path length of the reference light is changed (in the case of Michelson interferometer), and various processes are carried out to detect the actual shape. Since various signal processing algorithms to be used to determine the shape are known in the art, description thereof will be omitted in this specification.

As described above, measurement of the shape of a surface to be inspected, based on interference of light, enables non-contact and high-speed and high-precision measurement. For this reason, there are many commercial products already developed to do it.

However, if a plane is considered as a spherical surface having a curvature center at an infinite, it can be said that the shape that can be measured by conventional systems is limited to spherical shape. The shape of an article having a large aspherical amount can not be measured by the structure such as shown in FIG. 3 or 4. This is because the restriction that the wavefront as the measurement light is incident on the article to be inspected is plane wave in the case of FIG. 3 and it is spherical wave in the case of FIG. 4. At a position where the aspherical amount of the article to be inspected is large and the aspherical amount changes suddenly by a quantity not less than a half of the inspection wavelength, there are dark fringes closely juxtaposed with each other. Thus, fringes are not separated, and the measurement is no more attainable. High-precision measurement is not accomplished.

In consideration of it, currently, where an article having a large aspherical amount is to be measured, a system which is based on a mechanical contact probe, called a three-dimensional coordinates measuring machine (CMM), is used. Although contact probe method enables detection of aspherical surface to some extent, it can not accomplish non-contact, high-speed and high-precision measurement, which is a technical advantage of interferometer measurement.

SUMMARY OF THE INVENTION

It is accordingly an object of the present invention to provide a shape measuring method and/or a shape measuring system that enables high-speed and high-precision measurement of the shape of an article to be inspected.

In accordance with an aspect of the present invention, there is provided an interferometer for measuring a surface shape of an article to be inspected, comprising: an optical system for projecting light upon the article; wherein said optical system includes an optical element being effective to make, into an aspherical wave, a wavefront of light to be projected on the article, and being arranged to be replaceable by another optical element.

In one preferred form of this aspect of the present invention, said optical element is disposed at a pupil plane of said optical system.

The interferometer may further comprise a reference light producing member for producing reference light, wherein said optical element may be optically placed between said reference light producing member and the article to be inspected.

Said optical system may have an exit pupil at the article side which may be disposed at an infinite position.

The article may have an aspherical surface shape, wherein, at each position on the surface of the article, light may be perpendicularly incident on the article surface.

Said optical element may be of transmission type, or of reflection type. It may be a binary optics.

In accordance with another aspect of the present invention, there is provided an interferometer for measuring a surface shape of an article to be inspected, comprising: an optical system for projecting light upon the article; wherein said optical system includes a mirror having a variable surface shape and being effective to make, into an aspherical wave, a wavefront of light to be projected on the article.

In one preferred form of this aspect of the present invention, said mirror is disposed at a pupil plane of said optical system.

The interferometer may further comprise a reference light producing member for producing reference light, wherein said mirror may be optically placed between said reference light producing member and the article to be inspected.

Said optical system may have an exit pupil at the article side which may be disposed at an infinite position.

Te article may have an aspherical surface shape, wherein, at each position on the surface of the article, light may be perpendicularly incident on the article surface.

The interferometer may further comprise a reference light producing member for producing reference light and a processing system for processing an interference fringe to be produced by interference between the reference light from said reference light producing member and measurement light from the article inspected, wherein measurement using said variable surface shape mirror may be initiated from a calibration state in which a driving amount for said variable surface shape mirror is zero, and wherein the measurement of the shape of the article may be carried out on the basis of the driving amount as said variable surface shape mirror is deformed by the driving and the interference fringe is made into one color.

In accordance with a further aspect of the present invention, there is provided an interferometer for measuring a surface shape of an article to be inspected, comprising: an optical system for projecting light upon the article; wherein said optical system includes an optical element disposed at a pupil plane and being effective to make a wavefront of the light into an aspherical wave, and wherein said optical system has an exit pupil at the article side which is at an infinite position.

In accordance with a yet further aspect of the present invention, there is provided a Fizeau interferometer for measuring a surface shape of an article to be inspected, comprising: a beam expander for shaping light from a laser light source; a reference light producing member for reflecting a portion of light from said beam expander to produce reference light; an optical system for directing light, passed through said reference light producing member, to be incident on the article, thereby to produce measurement light; and an image pickup device for detecting an interference fringe to be produced by interference between the reference light and the measurement light from the article; wherein said optical system includes an optical element being effective to make a wavefront of light to be projected on the article, into an aspherical wave.

In accordance with a still further aspect of the present invention, there is provided a Michelson interferometer for measuring a surface shape of an article to be inspected, comprising: a beam expander for shaping light from a laser light source; a beam splitter for dividing light from said beam expander into two light beams; an optical system for directing one of the two light beams to be incident on the article, thereby to produce measurement light; and an image pickup device for detecting an interference fringe to be produced by interference between measurement light from the article and reference light provided by the other light beam; wherein said optical system includes an optical element being effective to make a wavefront of light to be projected on the article, into an aspherical wave, and being arranged to be replaceable by another optical element.

In accordance with a yet further aspect of the present invention, there is provided a method of measuring a surface shape of an article by use of an interferometer, comprising the steps of: projecting light through an optical element onto the article, thereby to produce measurement light, the optical element being effective to make a wavefront of light to be incident on the article, into an aspherical shape; producing reference light; producing an interference fringe by causing interference between measurement light from the article and the reference light; and replacing the optical element by another optical element.

In accordance with another aspect of the present invention, there is provided a method of producing an aspherical surface mirror, comprising the steps of: preparing a material for the mirror; processing the material; and measuring a surface shape of the processed material, in accordance with a method as recited above.

In accordance with a still further aspect of the present invention, there is provided a method of producing an aspherical surface mirror, comprising the steps of: preparing a material for the mirror; processing the material; and measuring a surface shape of the processed material by use of an interferometer having an optical system for projecting light upon the processed material, wherein the optical system includes an optical element being effective to make, into an aspherical wave, a wavefront of light to be projected on the processed material, and being arranged to be replaceable by another optical element.

In accordance with a yet further aspect of the present invention, there is provided a method of producing an aspherical surface mirror, comprising the steps of: preparing a material for the mirror; processing the material; and measuring a surface shape of the processed material by use of an interferometer having an optical system for projecting light upon the processed material, wherein the optical system includes a mirror having a variable surface shape and being effective to make, into an aspherical wave, a wavefront of light to be projected on the processed material.

In accordance with these aspects of the present invention, an aspherical surface element may be introduced by which, as an advantage of an interferometer, high-speed and high-precision measurement to an article having an aspherical surface can be accomplished easily.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

Figure 1:
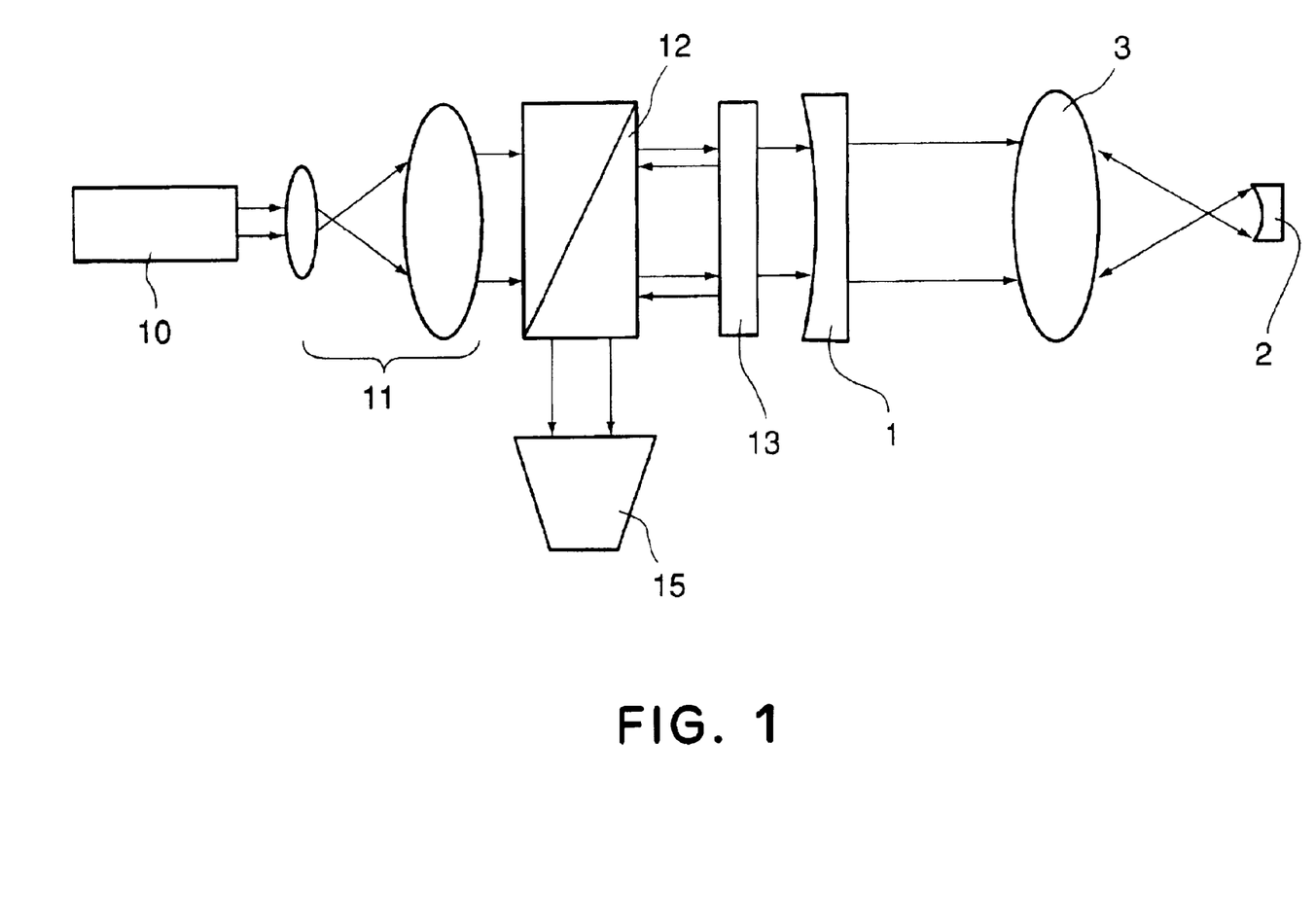
FIG. 1 is a schematic view of an interferometer according to a first embodiment of the present invention, using an aspherical surface plate.

FIG. 1 shows a shape measuring system according to a first embodiment of the present invention, for performing inspection of the shape of an aspherical surface mirror 2 in which a certain aspherical amount has been added to or combined into a spherical surface having a predetermined curvature.

Specifically, FIG. 1 shows a measuring system using a Fizeau interferometer like that of FIG. 3, and there are He—Ne laser 10, beam expander 11, a half mirror 12 and image pickup device 15. An article 2 to be inspected is irradiated with light from the laser 10, like in the conventional example. The structure shown in FIG. 1 is similar to that of FIG. 3 in that a reference light reflecting member 13 (providing a standard for the Fizeau interferometer) and an optical system 3 are disposed along a measurement light path between the half mirror 12 and the article 2 to be inspected. However, in the structure of FIG. 1, there is an aspherical plate (aspherical surface element) 1 inserted between the article 2 and reflection member 13 for obtaining reference light, the aspherical surface plate having a shape corresponding to the shape of the article 2. Specifically, the aspherical surface element 1 is disposed at a pupil plane of the optical system 3 which serves to project light to be incident on the article 2. Without the aspherical plate 1, the wavefront of light incident on the article 2 is a spherical wave. However, with the addition of the aspherical surface plate 1, a desired aspherical shape is added to the wavefront of light incident on the article 2. An interference fringe is produced by reflection light from the article 2 and reflection light from the reflection member 13, and it is then detected by the image pickup device 15 such as a CCD camera, for example. By processing the detected interference fringe, the surface shape of the article can be detected.

For measurement based on an interferometer, an aspherical surface wavefront has to be produced so that, at each position on the surface of the article 2, light is perpendicularly incident there. Once perpendicular incidence is assured, reflected light goes back along the same path of the oncoming incident light such that, unless there is no error in the shape of the article 2, the interference fringe to be produced on the image pickup device 15 such as a CCD camera disappears (fringe-free) as called "one color". Usually, the article 2 to be inspected has its aspherical surface expressed with respect to a coordinate system having a plane surface standard. Practically, however, an aspherical surface is produced by adding an aspherical amount to a mirror shape having a predetermined curvature. Thus, minute adjustment necessary for light from the He—Ne laser 10 to be perpendicularly incident on each position on the article 2 surface is carried out by adjusting the shape of the aspherical surface plate 1 in accordance with the aspherical amount added.

While the control of polarization state has not been described with reference to the structure of FIG. 1, the half mirror 12 may be a polarization beam splitter, and a quarter waveplate may be added between the polarization beam splitter 12 and the reference light reflection member 13, such that linearly polarized laser has its polarization direction registered with the transmission direction of the polarization beam splitter, as known in the art. Such structure can minimize the loss of light quantity.

The structure of FIG. 1 defines a system having a very wide applicability to various articles having a wide variety of aspherical shapes. When an article having a different aspherical shape is introduced, the aspherical surface plate 1 is replaced by another aspherical surface plate 1' effective to produce a wavefront corresponding to the aspherical surface shape of that article.

Although, in the aspherical surface plate 1 of FIG. 1, the aspherical shape is actually produced by polishing, as an alternative, a wavefront having a desired aspherical shape may be produced by using an optical element such as a binary optics, for example. Where a binary optics is to be used, since it needs a pattern to be simply formed on a parallel plate, complicated substrate shaping is unnecessary.

In this embodiment, the aspherical plate 1 is disposed at a pupil plane of the optical system 3. Here, the optical system 3 is made telecentric on the exit side, that is, an exit pupil thereof is disposed at an infinite.

With this arrangement, unwanted aberration such as coma, for example, due to the aspherical surface plate 1 can be reduced satisfactorily, and also the sensitiveness to the placement position becomes small. This is a significant advantage because, when the aspherical plate 1 is replaced by another aspherical plate, the replacement is very easy. Further, where a telecentric lens is used, even if during laser replacement there occurs a shift of the optical axis of the laser 10 as a light source, it does not cause a change in shape of the aspherical wavefront which is a standard wavefront to be projected on the article 2 to be inspected. The shift of optical axis of the laser would merely result in a shift of the inspecting aspherical wavefront in a direction perpendicular to the optical axis of the optical system of the interferometer. Therefore, a measurement error due to the shift of the laser optical axis can be corrected by adjustment for translationally moving the object 2 to be inspected, such that high precision measurement can be accomplished stably.

Figure 2:
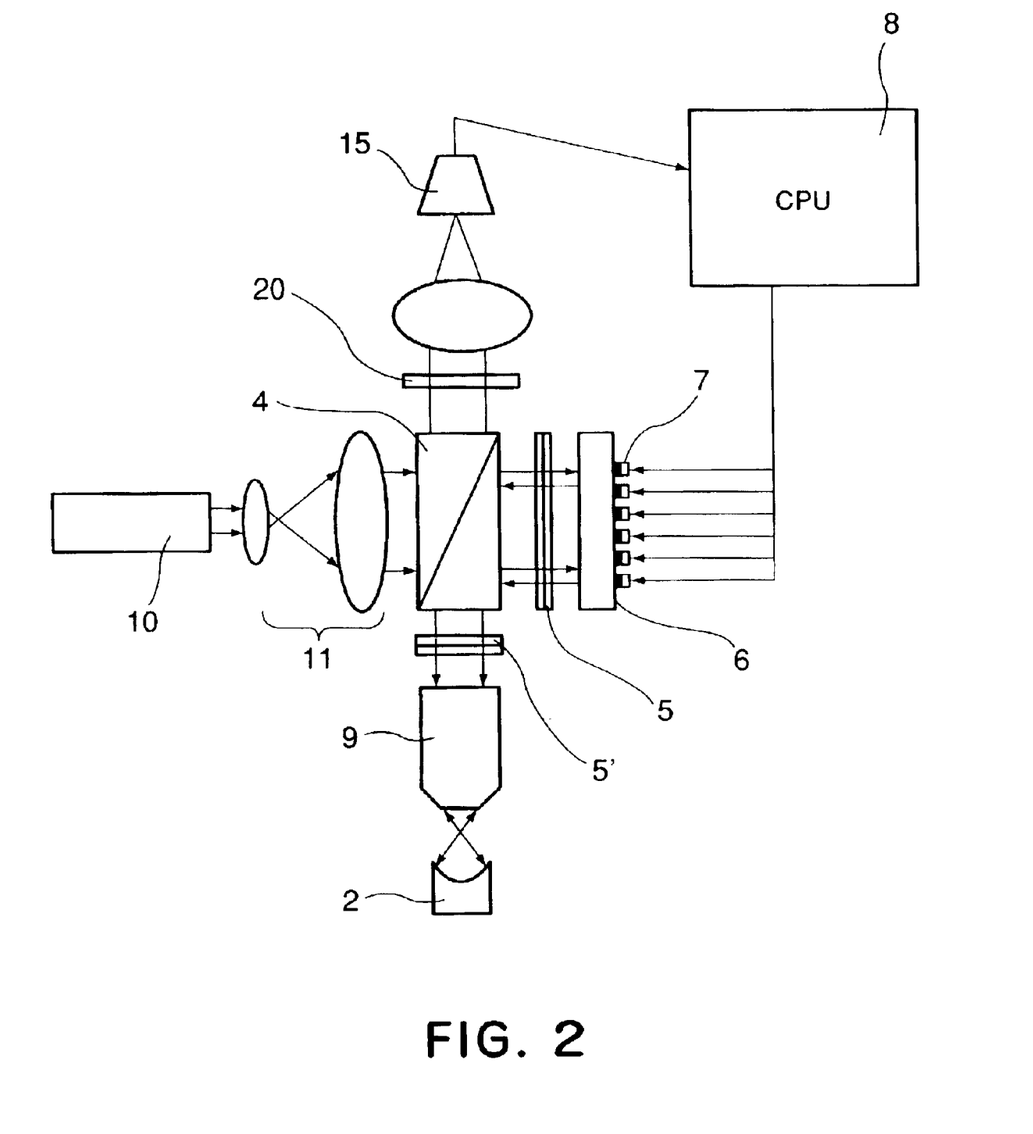
FIG. 2 is a schematic view of an interferometer according to a second embodiment of the present invention 4, using an adaptive mirror.

The present invention can be embodied by using a mirror 6 having a variable surface shape (which may be called an adaptive mirror) as shown in FIG. 2, in place of the aspherical surface mirror. Such adaptive mirror system can provide an arbitrary aspherical shape.

While the structure of FIG. 3 is a Fizeau interferometer, the system of FIG. 2 using an adaptive mirror constitutes a Michelson interferometer. Light emitted from a He—Ne laser 10 (light source) is expanded in its beam diameter by a beam expander and, then, it enters a polarization beam splitter 4. Where a linear polarization type laser is used as the He—Ne laser 10, if the polarization direction is set within a plane being orthogonal to the sheet of the drawing and with a predetermined angle (e.g. 45 deg.) defined with respect to the sheet of the drawing, the laser light can be projected on the polarization beam splitter 4, as a laser beam having an S-polarization component and a P-polarization component. The light incident on the polarization beam splitter 4 and having a P-polarization component passes through the polarization beam splitter 4 and a quarter waveplate 5, and it is transformed into circularly polarized light and it impinges on the adaptive mirror 6. Reflected light from the adaptive mirror 6 passes again through the quarter waveplate 5, whereby it is transformed into circularly polarized light. It is now reflected by the polarization beam splitter 4, toward the article 2 to be inspected.

On the other hand, the light reflected by the polarization beam splitter 4 passes through another quarter waveplate 5', whereby it is transformed into circularly polarized light, which passes through an objective lens 9 and irradiates the article 2 having an aspherical surface shape. The adaptive mirror 6 is disposed at a pupil plane of the objective lens 9. The light reflected by the article 2 passes again through the quarter waveplate 5', and then, as measurement light having P-polarized component, it passes through the polarization beam splitter 4.

As regards reference light, light initially incident on the polarization beam splitter 4 as S-polarized light and reflected thereby is used. Thus, in regard to the optical placement for the adaptive mirror 6, like the structure of FIG. 1, it is disposed between the article 2 and the member (polarization beam splitter 4) for producing reference light for measurement of the aspherical surface shape.

Of the light from the beam expander 11, the reference light having been initially reflected by the polarization beam splitter 4 as S-polarized light and the measurement light having passed through it as P-polarized light and then reflected back from the article 2 inspected, differ from each other in respect to the polarization direction (i.e., P vs. S) and thus they do not interfere with each other. Thus, in the structure of FIG. 2, an analyzer 2 is inserted to extract a polarization component in a predetermined direction, to cause interference, and the resultant is introduced into the image pickup device 15. The interference fringe is thus formed on the image pickup device 15 such as a CCD camera. By performing a predetermined process known in the art to the thus produced interference fringe, the shape of the article 2 can be detected.

Where the shape of the article 2 is known, a plurality of piezoelectric devices 7 disposed two-dimensionally may be actuated under the control of a CPU 8, to deform the adaptive mirror 6 into a shape corresponding to an idealistic shape such as a design value, for example. In that occasion, the plane wave incident on the adaptive mirror 6 is transformed into a wavefront having an aspherical surface shape proportional to the deformation amount of the adaptive mirror 6. Since the adaptive mirror 6 can provide any arbitrary shape on the basis of the piezoelectric devices 7, measurement of the aspherical shape of the article 2 can be accomplished without the aspherical plate 1 used in FIG. 1 (of source, it may be used).

The adaptive mirror 6 may be used also for measurement of an article having an arbitrary aspherical shape not known, with the arrangement shown in FIG. 2.

For measurement of an arbitrary shape, first, the measurement is initiated with the adaptive mirror 6 put in a calibration state. More specifically, all the piezoelectric devices 7 disposed two-dimensionally are driven by the same driving amount to thereby put the adaptive mirror 6 into the state of a plane mirror. Thereafter, the position of the article with respect to the optical axis direction is adjusted, and the surface shape of the article is roughly measured.

Then, on the basis of the result of rough measurement, the shape of the adaptive mirror 6 is changed. This operation for changing the shape of the adaptive mirror is continued until the interference fringe produced on the image pickup device 15 becomes "one color". In that occasion, if necessary, the position of the article 2 in the optical axis direction may also be adjusted. On the basis of the shape of the adaptive mirror 6 and the position of the article 2 in the optical axis direction, at the moment whereat the interference fringe becomes "one color", the aspherical amount of the article 2 being inspected can be detected.

With the procedure described above, the surface precision of an arbitrary aspherical surface can be inspected easily without provision of a special aspherical plate.

In accordance with a shape measuring system and a shape measuring method of the present invention, an aspherical surface element may be disposed along a measurement light path, for measuring an article having an aspherical surface to be inspected. This assures perpendicular incidence of measurement light upon the surface of the article to be inspected, and it enables precision measurement of the shape of the article by use of an interferometer. As a result, non-contact and high-speed and high-precision measurement of the shape of the article can be accomplished.

The aspherical surface element to be used in the present invention may be either of transmission type or reflection type.

Further, in accordance with the present invention, an adaptive mirror may be used to produce an aspherical surface by which, even if the shape of the article is not known, the surface shape measurement can be done with the precision of the interferometer.

Also, the present invention is applicable also to production of an aspherical surface mirror. More specifically, initially, a material of an aspherical surface mirror is prepared and, then, the material is processed by polishing, for example. Then, the surface shape of the thus processed material is measured by use of an interferometer according to any one of the embodiments described hereinbefore. This procedure assures efficient production of aspherical surface mirrors.

While the invention has been described with reference to the structures disclosed herein, it is not confined to the details set forth and this application is intended to cover such modifications or changes as may come within the purposes of the improvements or the scope of the following claims.

What is claimed is:

1. An interferometer for measuring a surface shape of an article to be inspected, comprising:

an optical system for projecting light upon the article, said optical system being telecentric on its exit side; and an optical element disposed at a pupil plane of said optical system, wherein said optical element is effective to make, into an aspherical wave, a wavefront of light to be projected on the article.

2. An interferometer according to claim 1, further comprising a reference light producing member for producing reference light, wherein said optical element is optically placed between said reference light producing member and the article to be inspected.

3. An interferometer according to claim 1, wherein the article has an aspherical surface shape, and wherein, at each position on the surface of the article, light is perpendicularly incident on the article surface.

4. An interferometer according to claim 1, wherein said optical element is of transmission type.

5. An interferometer according to claim 1, wherein said optical element is of reflection type.

6. An interferometer according to claim 1, wherein said optical element is a binary optics.

7. An interferometer for measuring a surface shape of an article to be inspected, comprising:

an optical system for projecting light upon the article, said optical system being telecentric on its exit side; and a mirror disposed at a pupil plane of said optical system, wherein said mirror has a variable surface shape and is effective to make, into an aspherical wave, a wavefront of light to be projected on the article.

8. An interferometer according to claim 7, further comprising a reference light producing member for producing reference light, wherein said mirror is optically placed between said reference light producing member and the article to be inspected.

9. An interferometer according to claim 7, wherein the article has an aspherical surface shape, and wherein, at each position on the surface of the article, light is perpendicularly incident on the article surface.

10. An interferometer according to claim 7, further comprising a reference light producing member for producing reference light and a processing system for processing an interference fringe to be produced by interference between the reference light from said reference light producing member and measurement light from the article inspected, wherein measurement using said variable surface shape mirror is initiated from a calibration state in which a driving amount for said variable surface shape mirror is zero, and wherein the measurement of the shape of the article is carried out on the basis of the driving amount as said variable surface shape mirror is deformed by the driving and the interference fringe is made into one color.

11. A method of measuring a surface shape of an article by use of an interferometer, comprising the steps of:

projecting light through an optical element and an optical system onto the article, thereby to produce measurement light, wherein the optical system is telecentric on its side, and wherein the optical element is disposed at a pupil plane of the optical system and is effective to make a wavefront of light to be incident on the article, into an aspherical shape;

producing reference light; and producing an interference fringe by causing interference between measurement light from the article and the reference light.

12. A method of producing an aspherical surface mirror, comprising the steps of:

preparing a material for the mirror;

processing the material; and measuring a surface shape of the processed material by use of an interferometer including an optical system for projecting light upon the processed material, wherein the optical system is telecentric on its exit side, and wherein the interferometer includes an optical element disposed at a pupil plane of the optical system and is effective to make, into an aspherical wave, a wavefront of light to be projected on the processed material.

13. A method of producing an aspherical surface mirror, comprising the steps of:

preparing a material for the mirror;

processing the material; and measuring a surface shape of the processed material by use of an interferometer including an optical system for projecting light upon the processed material, wherein the optical system is telecentric on its exit side, and wherein said interferometer further includes a mirror disposed at a pupil plane of the optical system, the mirror having a variable surface shape and being effective to make, into an aspherical wave, a wavefront of light to be projected on the processed material.

* * * * *

UNITED STATES PATENT AND TRADEMARK OFFICE
CERTIFICATE OF CORRECTION

PATENT NO. : 6,965,435 B2  Page 1 of 1
APPLICATION NO. : 10/207799
DATED : November 15, 2005
INVENTOR(S) : Hideki Ina It is certified that error appears in the above-identified patent and that said Letters Patent is hereby corrected as shown below:

COLUMN 2:
Line 26, "of performing" should read -- that perform --; and
Line 51, "can not" should read -- cannot --.

COLUMN 3:
Line 1, "can not" should read -- cannot --; and
Line 51, "Te" should read -- The --.

COLUMN 5:
Line 21, "BREIF" should read -- BRIEF --.

COLUMN 8:
Line 11, "source," should read -- course, --.

Signed and Sealed this

Fourteenth Day of November, 2006

JON W. DUDAS
*Director of the United States Patent and Trademark Office*